Dec. 31, 1957
C. E. RICKARD
2,818,082
POSITIVE RELEASE COUPLE AND VALVE
Filed Sept. 10, 1954
2 Sheets-Sheet 1
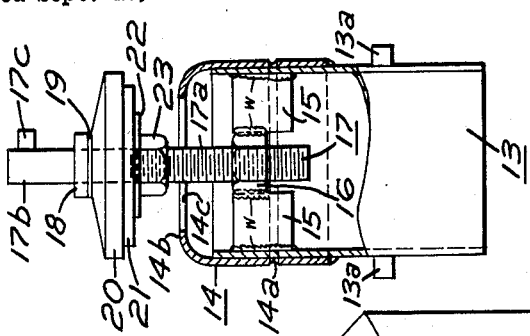
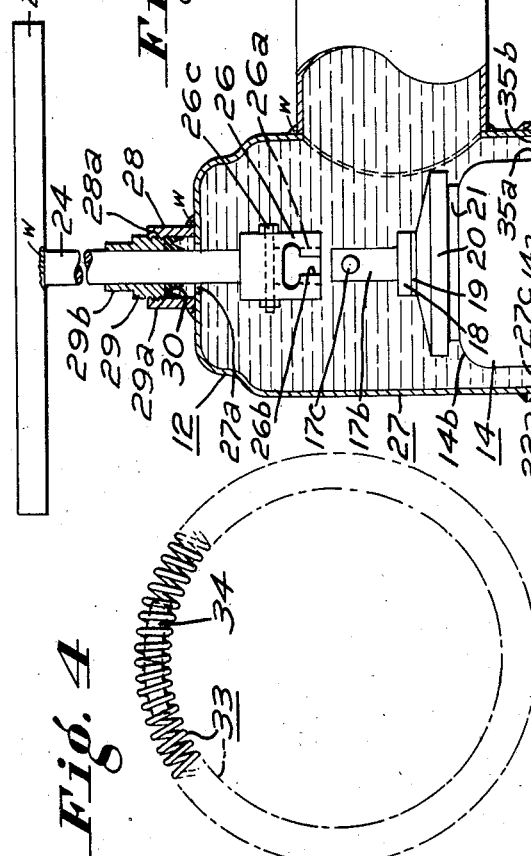
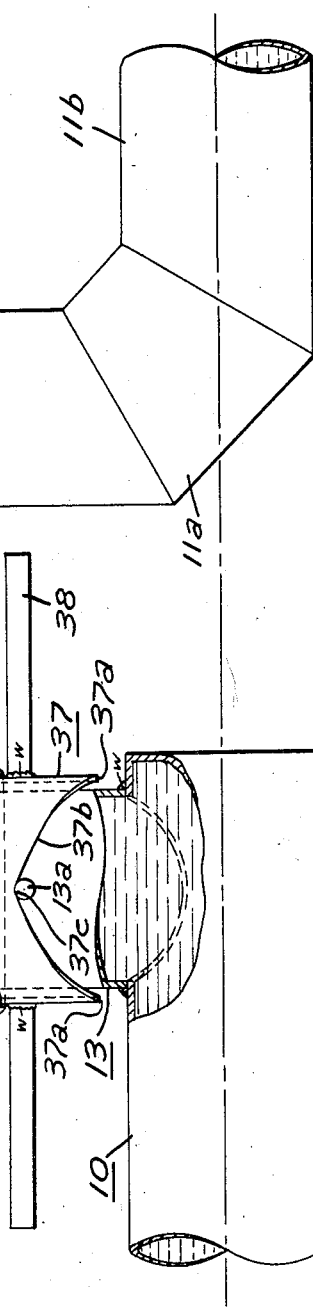
INVENTOR:
CLYDE E. RICKARD
BY
Green, McCallister & Miller
HIS ATTORNEYS.

Dec. 31, 1957  C. E. RICKARD  2,818,082
POSITIVE RELEASE COUPLE AND VALVE
Filed Sept. 10, 1954  2 Sheets-Sheet 2
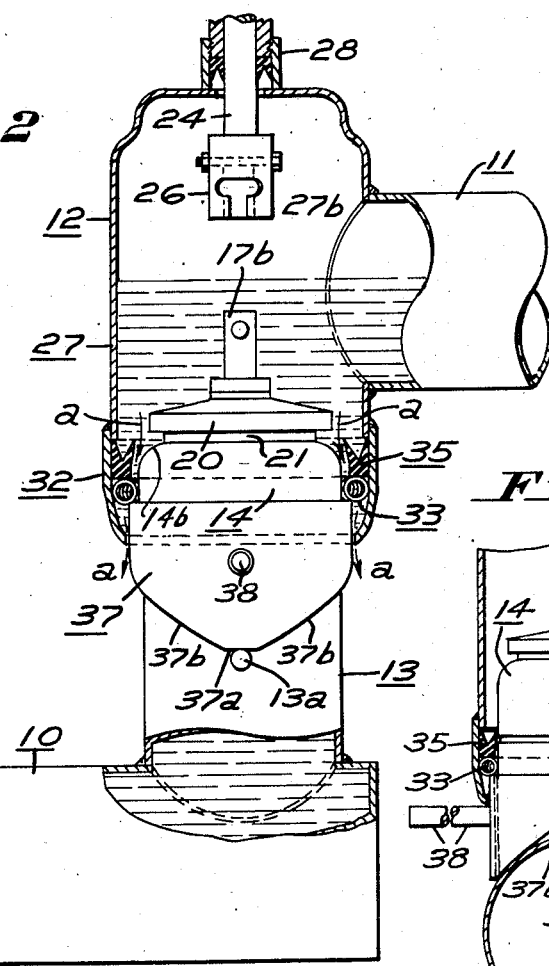
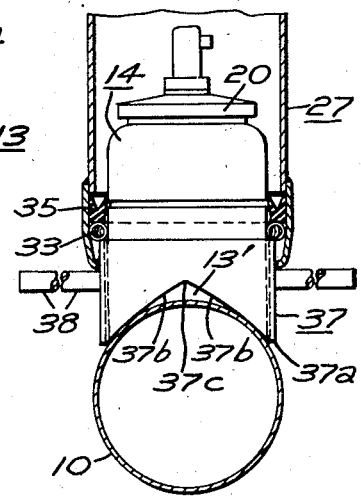
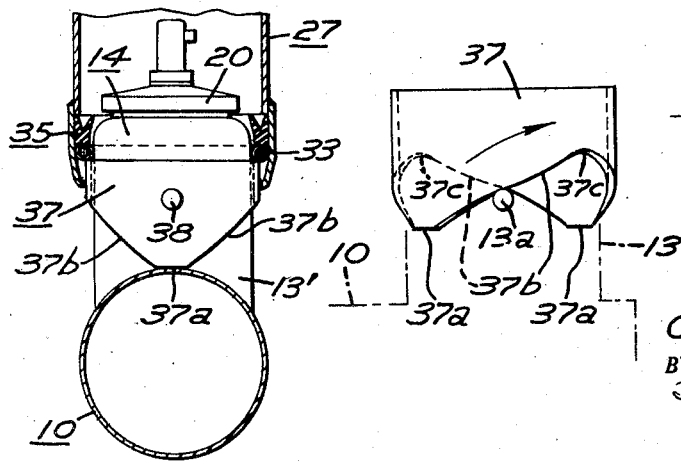
INVENTOR:
CLYDE E. RICKARD
BY
Green, McCallister & Miller
HIS ATTORNEYS.

United States Patent Office 2,818,082
Patented Dec. 31, 1957

2,818,082

POSITIVE RELEASE COUPLE AND VALVE

Clyde E. Rickard, Pittsburgh, Pa., assignor to McDowell Manufacturing Company, Millvale, Pa., a corporation of Pennsylvania Application September 10, 1954, Serial No. 455,242

20 Claims. (Cl. 137—321)

This invention relates to a positive release couple and particularly, to a release construction for a coupling that is subjected to fluid under pressure and the sealing and gripping relationship of whose parts is sensitive to fluid head or pressure.

A phase of the invention pertains to a partible member assembly or to a hydrant and to means for aligning its parts, for releasing its parts with respect to each other, irrespective of whether or not it contains fluid under a relatively nominal pressure or head, and for draining it of retained fluid.

Particularly in the portable irrigation field, a pipe member or line system is called upon to employ coupled parts in such an arrangement or positioning that even when the fluid or liquid from a main supply line or source, such as a pump, is shut off, the coupled members or parts will be subjected to what may be termed a relatively nominal, but still effective fluid head or pressure. By effective head or pressure, I have reference to one that is maintained by the fluid sealing action of a gasket element of a coupling and which may be sufficient to maintain the gripping action of a grip annulus or coil element employed for holding its parts in an assembled relationship.

Heretofore, a coupling of a so-called quick-release type has been provided with means for separating its parts by a relative turning movement between them or by a push and pull movement between them. However, these two types of separating or releasing actions have been essentially dependent upon conditions where there is no fluid head or pressure being exerted within the coupling or upon its gripping and sealing parts or elements. Where, for example, a so-called quick-release type of coupling is used with a hydrant or in such a manner that its interior contains a fluid under a nominal pressure or head, a problem has arisen from the standpoint of effecting a release of the gripping action of the grip annulus, so that the parts of the coupling may be separated and, from the standpoint of enabling an operator to lift off a coupling or hydrant body while lateral lines are connected to the coupling or hydrant.

Heretofore, it has been necessary to provide some form of supplemental drain valve means in a portable system, so that the fluid head can be released preliminary to moving the system to a new location and to accomplishing a release of the grip element of the couplings used. However, such a type of valve utilization has not been practical in connection with a hydrant. Also, my experience in this particular field has been that a supplemental or auxiliary drain valve introduces additional problems from the standpoint of its tendency to clog, from the standpoint of introducing possible leakage points, from the standpoint of complicating the structure, and from the standpoint of the time delay incident to a preliminary drainage of the system before a release of the parts of the couplings involved.

I have discovered that there is an important need for some form of coupling construction wherein the gripping action of the parts as well as the sealing of its gasket can be effectively and positively released substantially simultaneously and under conditions of nominal pressure in the system. This need, by way of example, has arisen in connection with the utilization of a hydrant employed to connect a main feeder or supply line of a fluid supply system to take-off lines and spray heads, etc., of a portable irrigation system. In this connection, it is advantageous to provide the hydrant with a coupling, closure or shut-off valve, so that its stationary or closure valve part may be separated from the take-off or distribution members of the system and the latter may be moved from place to place and connected with the stationary part of other hydrants. In such a system, it is advantageous to retain the closure valve part of the hydrant as a permanent part of the main feeder or supply line which is to remain in position.

It has thus been an object of my invention to provide a solution to the problem presented;

Another object has been to incorporate means in a fluid sealing coupling whereby its sealing means may be employed as a drain valve after line pressure has been shut off;

Another object has been to devise a coupling for fluid-carrying members which can be effectively and positively released, both as to the sealing and gripping relationship of its parts under conditions of effective but nominal fluid or pressure;

A further object has been to provide a construction for releasing a fluid-pressure sensitive gripping means of a coupling while it is being subjected to an effective but, relatively nominal fluid head or pressure after the fluid, supply has been shut off;

A still further object of my invention has been to develop a new and improved form of hydrant coupling construction whose parts are partible or separable and whose gripping or sealing parts or elements may be effectively released while a head of liquid or fluid is being maintained in the hydrant, but after the source of fluid or liquid has been shut off;

These and many other objeects of my invention will appear to those skilled in the art from the illustrated embodiment thereof as hereinafter set forth and described.

In the drawings,

Figure 1 is a side view in elevation and partial section showing a positive release couple of my invention, as applied particularly to a hydrant; in this figure, the coupling parts of the construction are in a fluid sealed-off and gripped relationship with respect to each other, under a head of fluid in the hydrant after active fluid flow from a main or supply line has been shut off;

Figure 1A is an end view or a view taken at substantially right angles to and on the same scale as Figure 1 and illustrates the construction of an inner annular member which provides a coupling nose and carries the closure part of a two-part valve construction; in this figure, the valve construction is shown in an open or fluid flow-providing relationship;

Figure 2 is a side view on the scale of Figure 1 and in partial section showing the relationship of the parts after a positive or active fluid flow from the supply line has been shut off and a releasing means (which is shown in Figure 1 in an initial or non-releasing position) has been moved to a releasing position with respect to or on the inner annular member, to simultaneously move a grip element or annulus to a non-gripping relationship with respect to the inner annular member, and to move a sealing element or gasket to a non-sealing relationship with respect thereto, such that drainage is effected and the inner annular member may be removed from an outer annular or housing member of the construction;

Figure 3 is a somewhat diagrammatic detail view in elevation illustrating an intermediate position of the releasing means with respect to the inner annular member of the construction; in this figure the releasing means is in a substantially half-way position between the positions of Figures 1 and 2;

Figure 4 is an enlarged somewhat fragmental plan view of a representative grip element, annulus or coil which may be employed in the construction of my invention;

Figure 5 is a reduced view in end elevation taken at right angles to Figure 2 and showing a slightly modified couple as applied to a hydrant in accordance with my invention; in the figure, the construction is in a fluid sealing-off and gripping relationship, such as accomplished when active fluid pressure or flow from the supply line has been effected;

Figure 6 is a view similar to Figure 5, but showing the positioning of parts of the construction of Figure 5 after positive or active fluid flow has been shut off and a body part has been raised or lifted with respect to a nose part.

I have chosen to illustrate my invention as applied to a hydrant, since the problem which is involved arises particularly in connection with the utilization of a hydrant. In carrying out my invention, I employ a couple or coupling which has or which utilizes a pair of inner and outer annular members 13 and 27 which are to be releaseably connected together, one of which is to be employed as a housing or body part in a spaced-apart relationship with the other, the other of which has a nose part for connection to a main feeder or fluid supply line and which is shown provided with a closure part of a control and shut-off valve. The outer annular member 27 is provided with a coupling throat part 32 which with a nose part 14 of the inner member 13, have opposed operating surfaces that define an operating spacing therebetween for a grip element, annulus or coil 33 and for a fluid-pressure-sensitive resilient annular gasket or sealing annulus 35.

The gasket 35 and the grip annulus 33 are operatively carried by the throat of or upon the operating surface of the outer member 27 for engagement with and about the opposed operating surface of the inner member 13 to hold the inner and outer members in a fluid sealed-off relationship with respect to each other upon the application of positive fluid pressure. Also, I provide a third annular member 37 which constitutes a release means or member and which is operatively mounted for relative movement on or over an outer end portion of the inner or second annular member 13 and has cam means for positively moving it inwardly and outwardly with respect to the annular member 13 to, in its inner position, engage the grip annulus 33 and move it backwardly or towards the diverging end of a converging annular operating spacing portion of the operating spacing between the members 13 and 27. It will be noted that the annulus 33 is a means carried by at least one of the pair of annular members that serves to limit inward movement of the release member 37 relative to the housing member 27, as controlled by the engagement of an outer lip portion of the gasket 35 with a position-limit or stop edge 27c of the member 27. The release member 37 thus produces a relative outward movement of the inner annular member 13 (compare Figure 2 with Figure 1) with respect to the release member and the outer annular member 27 to a position such that both the grip annulus 33 and the annular gasket 35 define or have a clearance spacing with the operating surface of the inner annular member 13 or its nose part 14. When such a clearance spacing is defined, the construction is such that fluid within the outer annular member 27 and any gravity feed connections thereto will be drained-out between the inner and outer annular members, and the inner and outer members may be pulled apart or separated, so as to leave the inner member 13 in a stationary position on a main supply line or pipe member 10. The outer annular member 27 is adaptable to carry an operating or control part of a two-part valve construction, so that its closure part 20 may be adjusted, opened and closed when the inner and outer members are in a coupled relationship. The mounting of the operating part of the two-part valve construction is such that it may be readily replaced, if desired, with a spray head connection or with a closing-off plug.

The third annular part 37 is operated by cam means and has a collar or sleeve which is advanced by such cam means into a grip-coil and sealing-annulus-releasing position, inwardly with respect to or along the annular member 13 and against a nominal fluid pressure or head which is retaining the grip coil and sealing annulus, respectively, in a gripping and in a fluid sealing relationship. The releasing means has two extreme or inner and outer positions; it serves as alignment means for the outer annular part 27 and is retained in either of these two positions until manually moved therefrom. The fluid pressure against which the releasing means has to work is relatively nominal, as represented by the head of fluid in the system and particularly, as applied to the chamber of the outer annular member 27 and may reach a maximum of, for example, 10 pounds, although it will usually be in the neighborhood of a few pounds with a maximum of about 5 pounds pressure.

The contemplated usage of the releasing means 37 is after fluid flow has been shut off from the main or feeder line and an attempt to operate it before such shut-off, will serve as a warning to the operator in view of the great effort which is required to effect any movement of its cam surfaces. For example, a fluid pressure in the neighborhood of 75 up to 200 pounds may be employed from the source or feeder line and it will be impossible to manually operate the releasing means under such conditions and until the pressure has been reduced to a nominal value, as accomplished by the closing of the valve part carried by the inner annular member 13.

Referring particularly to Figures 1 and 1A of the drawings, a source of fluid line pressure of a main feeder or supply line is represented by a pipe member 10 which is connected through couple unit 12 to a take-off or distribution line pipe member 11. The member 11 is shown provided with suitable offset pipe member connections or angle members 11a to a pipe member 11b which like the member 10, may rest upon the ground surface or level. However, it should be noted that a direct line tie or connection may be made with the annular member or hydrant body 27. Customarily, a quick-release type of coupling of the general type shown in Figure 1 will be interposed between the pipe member 11b and a connecting pipe member (not shown).

The annular member 13 which constitutes a second annular member of my construction and provides a nose part, is shown secured at its lower end, as by weld metal w, to the pipe member 10 to receive fluid under pressure directly therefrom and supply it to the outer annular member 27 which provides a housing body, has a coupling throat part, and whose chamber is connected to the take-off pipe member 11. The latter, as shown in Figure 1, is secured to extend from a side opening 27b in the member 27 by suitable means, such as weld metal w. The releasing means 37 which constitutes an alignment and slide cam-operated collar or sleeve 37, is shown operatively positioned on the annular member 13 to project upwardly or inwardly therealong into the throat part 32 of the outer annular member 27.

The inner annular member 13, as shown particularly in Figure 1A, is provided with a pair of opposed-projecting side cam pins 13a near its lower or outer end portion, and its upper or inner end portion has the nose part 14 which is positioned thereover and extends inwardly or upwardly therefrom. The nose part 14 is shown with a safety latch groove 14a for the grip coil or annulus 33 of spring-like construction to provide means for preventing it from being inadvertently, under surging fluid conditions, released from the nose part 14. The inner or upper end portion of the nose part 14 is rounded or curved inwardly to provide a nose seating or valve seating surface portion 14b about a flow opening or orifice 14c through its inner end. The nose part 14 is shown secured in position as a part of inner annular member 17 by weld metal w. As shown in Figure 2, the portion 14b provides an enlarged spacing and facilitates the definition of a drain passageway with an inner side or lip portion of the gasket 35.

To provide a mount for the two-part valve construction, a pair of oppositely-positioned ears or wings 15 extend inwardly-radially from the inside of the inner end of the member 13 and are secured by weld metal w to a threaded adjusting nut 16 at substantially the axial center of the assembly. A valve stem 17 has a threaded portion 17a which is adjustably mounted for movement within the nut 16 and which receives a threaded positioning nut 23 adjacent its upper portion. An outer or upper end stem portion 17b of the stem 17 is of smooth configuration and carries an integral annular flange 18 which with the nut 23, is employed to secure a valve disc or head 20 in position on the stem 17. A fiber gasket 19 is shown positioned between the valve head 20 and the flange 18 and a metal positioning washer 22 is shown located between the nut 23 and a disc-like or circular sealing or seating gasket 21. The gasket 21 is positioned on the underside of the valve head 20 to cooperate with the valve seating portion 14b. That is, when the valve head 20 is moved downwardly towards the seating surface portion 14b by rotating its valve stem 17, the gasket 20 shuts or seals off fluid flow from or through the orifice or opening 14c in the inner end of the nose part 14.

A second upper, operating or control part of the valve construction is carried by the annular member 27 and has a stem 24 extending through a central aperture or opening 27a therein. At its inner or lower end, the stem 24 carries a split-sleeve type of socket part 26 which is shown secured in position by a nut and bolt clamping assembly 26c. The stem or rod 24 is operated by a cross rod or hand lever member 25 which is secured thereto by weld metal w. The socket part 26 has a cylindrical bore 26a to receive the upper or inner end portion 17b of the valve stem 17 and has a bayonet-edge slotted portion 26b to receive a latch pin 17c which projects from a side of the stem portion 17b, to thus provide a removable connection for the two parts of the valve construction and to make possible an adjustment of the stem 17 through the agency of the hand lever 25 and its stem 24.

A stuffing box 28 is secured by weld metal w on the upper end of the annular member 27 and over the opening 27a therein to carry an annular V-shaped packing gasket 30 of resilient material in its bore. The upper end of the box 28 is threaded at 28a to receive a packing or gland nut 29 and cooperate with its threaded end 29a. The packing nut 29 is provided with a wrench-flat 29b for adjusting its positioning within the stuffing box 28. It will be apparent that the packing or gland nut 29 with the upper valve part may be removed and a closure plug may be inserted in place thereof. It will also be apparent that the valve head 20 will be retained in any given adjusted relationship and that the outer annular part 27 may be removed without charging such adjusted relationship.

The annular member 27 in its interior defines a fluid chamber and serves as a housing body for the construction and at its lower or outer end is provided with the throat part 32 which is mounted thereover to extend therefrom by means, such as weld metal w. The throat part 32 has a cylindrical or annular portion of uniform diameter 32a for housing or retaining the annular resilient gasket 35 and has a forwardly-converging, tapered or cone-shaped mouth portion 32b which defines an operating and carrying surface for the annular grip annulus 33. At its extreme outer end, the throat part 32 has an inner rim edge 32c which has a close clearance spacing with the member 37 and serves as a guide edge to cooperate with the third annular or release member 37 to hold the assembly in an aligned or upright position.

The annular sealing gasket 35 has a pair of inner and outer and spaced-apart lip portions, the inner portion 35a of which is adapted to be pressed against the nose part 14 and the outer of which 35b is adapted to press against the inner operating surface of the portion 32a to define an internal fluid-pressure sensitive chamber and positively seal-off fluid flow between the joint represented by the two members 13 and 27. The pressure heel of the gasket 35 cooperates with the grip annulus 33 to, under the influence of fluid pressure, advance the grip annulus along the converging end of the tapered mouth portion 32b and provide a positive gripping engagement between opposed operating surfaces of the parts 14 and 32. A comparison of Figures 1 and 2 will show that the relative relationship of the parts 33 and 35 when they are in a gripping and sealing relationship and when they are in a clearance-defining and passageway-defining relationship with respect to the opposed operating surfaces of the members 27 and 13.

As shown particularly in Figure 4, the grip coil 33 is made up of substantially continuous, integral, coil turns or convolutions in a spaced-apart relationship and in an articulated or joined relationship at end portions thereof, as effected by a curved inset piece 34 which permits them to expand and contract and the annulus, itself, to move from its normal inner diameter to a contracted inner diameter under the influence of positive fluid pressure and, as caused by advancing or moving it towards the converging end of the tapered portion 32b. As shown in Figure 2, the pre-shaped inner diameter of the coil of annulus 33 is such that it defines a slight clearance spacing with a maximum outer diameter of the nose part 14 or of the annular operating surface of the inner member 13, such that the inner member 13 and its nose part 14 may be withdrawn axially-outwardly with respect to the housing or outer member 27.

Referring particularly to Figures 1, 2 and 3, the releasing member 37 is in a form of a slide collar mounted over the outer end portion of the member 13. It has an operating or turn handle provided by a pair of outwardly and oppositely extending manual turn arms 38 secured thereto, so that it may be turned or rotated about or with respect to the second annular member 13. The inner edge of the member 37 is of planar annular shape and is adapted to engage upon one side of the grip annulus or coil 33 when the member 37 is moved inwardly or upwardly along the nose part 14. It will be noted that in the position of Figure 1, where the coupling parts are in a gripped and sealed relationship, the gasket 35 has a forwardly or downwardly advanced relationship with respect to the stop edge 27c of the member 27 and has advanced the grip coil 33 in the direction of the converging end of the throat portion 32b or of the converging operating spacing portion defined with the nose part 14.

The outer surface of the third annular member 37 is of cylindrical or annular shape and defines a very slight clearance spacing with respect to the annular guide rim 32c of the first annular member 27 to, in this member, align the parts with respect to each other, but to, at the same time, permit relative sliding movement. The bottom edge of the third annular member 32 defines cam surfaces which consist of a pair of oppositely-positioned apex surfaces or cam edge portions 37a, concavely-curved oppositely-positioned intermediate cam surfaces or cam edge portions 37b, and a pair of oppositely-positioned inner valley cam surfaces or cam edge portions 37c. When the apex surfaces 37a are in engagement or track with oppositely-extending cam pins 13a of the annular member 13, the annular member 13 is in its maximum outwardly-advanced or releasing position and when the valley surfaces 37c are in engagement with the pins 13a, the member 13 is in its maximum inwardly-advanced position, whereby it is operative with respect to the normal gripping and sealing action of the elements 33 and 35. A rotation or turning of the arms 38 is employed for positively moving the member 13 along the cam surfaces or edges between its extreme positions. In Figure 3, I have shown the cam surfaces in an intermediate or half-way position between the extreme positions of Figures 1 and 2.

It will be apparent that utilizing the release couple of my invention, as exemplified in the drawings in connection with a hydrant, that I have been able to combine coupling members with a separable or two-part valve, wherein the coupling can be positively released from the standpoint of its sealing and gripping elements or members, even when fluid under nominal pressure is applied thereto. I utilize the camming of the annular member 37 into an inwardly advanced and releasing engagement with the grip element 33 and through the grip element upon the gasket 35. This movement produces a relative outward movement of the inner annular member 13 which carries the nose part 14 of the coupling construction, so that the grip element and the gasket element are both out of engagement therewith and, as shown in Figure 2, a drainage flow, as represented by arrows a, will be effected, and the partible coupling parts 37 and 13 may be axially separated with respect to each other when there is fluid within the chamber of the member 27, as well as when there is no fluid therein.

In the embodiment of my invention shown in Figures 5 and 6, the construction is the same as that shown in Figures 1, 1A and 2, except that the inner annular member 13' is of shortened extent such that the cam pins 13a may be eliminated. In other words, the third annular, releasing or camming member 37 has an operatively positioned relationship with an adjacent annular portion of the cross, perpendicularly positioned or transverse pipe member 10, in order that its cam edge portions 37a and 37b engage the periphery or wall of the member 10 to effect the previously described type of camming action. In Figure 5, the member 37 is in its down or outer positioning whereby the coupling parts will provide a gripping and fluid sealing off action; in Figure 6, the member 37 is in its upper or inner positioning whereby the gripping and sealing action of the elements 33 and 35 is released with respect to the nose part 14.

What I claim is:

1. In a coupling having a pair of annular members to be connected together in a fluid sealed-off relationship, one of which is a housing to be positioned in a spaced-apart relationship about the other, the pair of members having opposed operating surfaces defining an operating spacing therebetween, an annular fluid sealing gasket operatively positioned upon the operating surface of the housing member and about the operating surface of the other member and adapted to engage said surfaces and thereby close the operative spacing therebetween, a grip annulus disposed in the operating spacing to grip the opposed operating surfaces, a release member operatively positioned for movement relative to the other member of the pair, means carried by at least one of the pair of members to limit movement of said release member relative to the housing member, said other member defining a clearance spacing with said gasket when said other member is moved relative to the housing member, and said release member having means for moving the other member relative to the housing member and relative to said gasket and grip annulus until said gasket and said other member define a fluid drain passageway with respect to the operating surface of the other member.

2. A coupling as defined in claim 1 wherein said first-mentioned means is a radially-projecting means operatively carried by the housing member and engaged by said release member to limit relative movement between the housing member and said release member when said release member is moved relative to the other member of the pair.

3. In a coupling having a pair of annular members to be connected together in a fluid sealed-off relationship, one of which is a housing to be positioned in a spaced-apart relationship about the other, the pair of members having opposed operating surfaces defining an operating spacing therebetween, annular sealing and holding means operatively positioned upon the operating surface of the housing member and about the operating surface of the other member to engage said surfaces and hold one surface in position with respect to the other and close the operating spacing therebetween, said pair of members on relative movement therebetween defining a clearance spacing with a portion of said annular sealing and holding means, a release member operatively positioned for movement relative to the other member of the pair and having means for moving the other member relative to the housing member and relative to the annular sealing and holding means until said last-mentioned means and said other member define a fluid drain passageway with respect to the operating surface of the other member.

4. A coupling as defined in claim 3 wherein, cam means projects transversely from the other member of the pair, said release member has a cam edge tracking on said cam means, and a turning means is secured to said release member to move said cam edge along said cam means and effect the relative movement between said release member and the other member.

5. In a coupling having a pair of annular members to be connected together in a fluid sealed-off relationship, one of which is a housing to be positioned in a spaced-apart relationship about the other, the pair of members having opposed operating surfaces defining an operating spacing therebetween, an annular fluid sealing gasket operatively positioned upon the operating surface of the housing member and about the operating surface of the other member and adapted to engage said surfaces and thereby close the operative spacing therebetween, a grip annulus disposed in the operating spacing to grip the opposed operating surfaces, a release member operatively positioned for movement relative to the other member of the pair, means carried by at least one member of the pair of members to limit movement of said release member relative to the housing member, said release member having means for moving the other member relative to the housing member and relative to said gasket and grip annulus until said gasket and said other member define a fluid drain passageway with respect to the operating surface of the other member, the opposed operating surfaces defining a converging spacing portion towards an outer end of the operating spacing therebetween, said gasket being fluid-pressure-sensitive to advance said grip annulus along the converging spacing portion upon the application of fluid pressure to the coupling, said grip annulus having a gripping surface along its outer diameter to grip-engage the operating surface of the housing member and having a second gripping surface along its inner diameter to grip-engage the operating surface of the other member of the pair when said grip annulus is advanced along the converging spacing portion, said second gripping surface having a spaced-apart relation with the operating surface of the other member when said grip annulus is positioned adjacent an inner end of the converging spacing portion, and said release member having means to engage said grip annulus and move it towards the inner end of the converging spacing portion when fluid pressure is released.

6. In a coupling having a pair of annular members to be connected together in a fluid sealed-off relationship, one of which is a housing to be positioned in a spaced-apart relationship about the other, the pair of members having opposed operating surfaces defining an operating spacing therebetween, an annular fluid sealing gasket operatively positioned upon the operating surface of the housing member and about the operating surface of the other member and adapted to engage said surfaces and thereby close the operative spacing therebetween, a grip annulus disposed in the operating spacing to grip the opposed operating surfaces, a release member operatively positioned for movement relative to the other member of the pair, means carried by at least one member of the pair of members to limit movement of said release member relative to the housing member, said release member having means for moving the other member relative to the housing member and relative to said gasket and grip annulus until said gasket and said other member define a fluid drain passageway with respect to the operating surface of the other member, a fluid supply line connected to an outer end portion of the other member of the pair, a fluid take-off line connected to the housing member, a rounded nose having a fluid discharge orifice and being provided at an inner end portion of the other member to supply fluid to the housing member, and said gasket defining the drain passageway with said rounded nose.

7. A coupling as defined in claim 6 wherein a shut-off valve is operatively mounted within the other member of the pair to seat upon said nose and close off fluid flow through its discharge orifice into the housing member.

8. In a coupling having a pair of annular members to be connected together, one of which is a housing to be positioned in a spaced-apart relationship about the other, the pair of members having opposed operating surfaces defining a converging annular spacing towards one end of the coupling, a grip annulus operatively positioned within the housing member and about the other member and between the opposed operating surfaces for movement towards the converging spacing, said annulus having a thickness greater than the minimum clearance and less than the maximum clearance of the converging annular spacing an annular release member operatively positioned on the other member of the pair, and means to advance said release member along the other member of the pair into engagement with said grip annulus and move said grip annulus away from the minimum clearance of the converging spacing for releasing the other member of the pair and draining residual fluid in the coupling.

9. In a coupling for holding an annular member in position with respect to a housing member, wherein the members have opposed operating surfaces defining an operating spacing having a converging portion towards one end of the housing, a grip coil annulus operatively positioned within the housing member and about the annular member and between their opposed operating surfaces for movement along the converging spacing portion, a fluid-pressure-sensitive annular gasket positioned within the operating spacing for sealing off fluid flow between the members upon the application of fluid pressure, said gasket having a pressure heel to engage said grip annulus and advance it along the converging portion of the spacing upon the application of fluid pressure, said gasket also having a maximum thickness which is greater than the minimum clearance and less than the maximum clearance of the converging spacing portion and a release means operatively positioned on the annular member for relative movement with respect to the annular member into releasing engagement with said grip annulus and through said heel portion into releasing engagement with said sealing annulus, so that residual fluid may be drained from the coupling and the annular member may be withdrawn from the housing member.

10. In a coupling for holding an annular member in position with respect to a housing member, wherein the members have opposed operating surfaces defining an operating spacing that converges towards one end of the housing member, a grip annulus operatively positioned about the annular member and within the housing member and between the opposed operating surfaces for movement along the converging spacing, a fluid-pressure-sensitive sealing annulus operatively positioned within the housing and about the annular member and within the operating spacing and in an operative relationship with said grip annulus to advance the grip annulus along the converging spacing upon the application of fluid pressure, said sealing annulus having a maximum thickness which is greater than the minimum clearance and less than the maximum clearance of the converging spacing, a release member operatively positioned on the annular member for relative movement into engagement with said grip annulus, said release member having means to, after its engagement with said grip annulus, move said annular member out of gripping engagement with said grip annulus and to move it out of sealing engagement with said sealing annulus to release said annular member with respect to said housing member and define a drainage passageway with said sealing annulus.

11. In a coupling having a pair of annular members to be connected together in a fluid sealed-off relationship, one of which is a housing to be positioned in a spaced-apart relationship about the other, the pair of members having opposed operating surfaces defining an operating spacing therebetween, an annular fluid sealing gasket operatively positioned within the housing member and about the other member and adapted to engage said members and thereby close the off operating spacing between the members, grip means cooperating with the opposed operating surfaces of the pair of members to hold them in a connected relationship with each other, an annular release member operatively positioned on the other member of the pair for relative movement with respect thereto, the pair of annular members defining an inner chamber within the coupling that is capable of returning a quantity of the fluid after an external application of fluid under pressure has been shut off, said opposed operating surfaces defining a diverging spacing portion when the other member is moved relatively to the housing member, and cam means operatively positioned between said release member and the other member of the pair to advance said release member into engagement with said grip means and move the other member relatively outwardly with respect to the housing member until said gasket defines a drain passageway with the operating surface of the other member.

12. In a coupling device having a pair of annular members to be connected together, one of which is to be positioned as a housing in a spaced-apart relationship about the other, the pair of members having opposed operating surfaces defining an operating spacing therebetween which has a portion that converges toward an outer end of the coupling, a nose part on the other annular member and having a rounded-off inner end portion defining an enlarged spacing with respect to the housing member, a sealing annulus operatively carried by the housing member within the operating spacing to engage said nose part beyond its rounded-off inner end portion and seal off fluid flow between the pair of members, a release means operatively positioned on the other member for movement into an inwardly pushing relationship with said sealing annulus to move it backwardly with respect to said nose part and into a position in substantial alignment with its rounded-off end portion to define a fluid drain passageway with respect thereto.

13. A coupling as defined in claim 12 wherein, an annular grip annulus is operatively positioned within the housing member and in the operating spacing in engagement with said sealing annulus for advancement towards the converging portion of the spacing upon the application of positive fluid pressure to said sealing annulus, and said release means engages said annular grip annulus to hold said sealing annulus in its drain-passageway-defining position.

14. A coupling as defined in claim 13 wherein said grip annulus has an internal diameter smaller than the external diameter of the annular member and its internal diameter is reduced when said grip annulus is advanced along the converging spacing portion into gripping engagement between the opposed operating surfaces of the pair of members.

15. In a positive release couple, an annular housing member having a closed-off end portion defining a fluid retaining chamber and having an open end throat part defining an operating surface therein, a hollow annular member to be positioned within said throat part and having a nose part defining an opposed operating surface with the operating surface of said throat part, said operating surfaces having a spaced-apart relationship with respect to each other and defining a converging operating spacing towards an outer end of said throat part and a diverging operating spacing towards the inner end of said throat part, a fluid-pressure-sensitive sealing annulus operatively carried on the operating surface of said throat part for sealing engagement with the operating surface of said nose part, a stop edge on the housing member to limit inward movement of said sealing annulus, a flexible grip annulus operatively carried by the operating surface of said throat part and having a normal internal diameter larger than the outer diameter of said nose part to define a clearance spacing with respect thereto, said sealing annulus advancing said strip annulus along the converging spacing and into gripping engagement with the opposed operating surfaces upon the application of fluid pressure and itself simultaneously moving into sealing engagement with the opposed operating surfaces, a slide collar operatively mounted on the hollow annular member for movement within the housing member and into engagement with said grip annulus, and means cooperating with said slide collar and the hollow annular member to advance said slide collar into its defined position, to move said grip annulus backwardly with respect to the inwardly diverging spacing, to move said sealing annulus into engagement with said stop edge, and to move the hollow annular member outwardly with respect to the housing member until said sealing annulus defines a drainage passageway with respect to said nose part and said grip annulus is out of engagement with said nose part.

16. A coupling as defined in claim 15 wherein said throat part has a guide rim in a relatively close sliding relationship with respect to said slide collar to align the members with respect to each other.

17. A coupling as defined in claim 15 wherein, the hollow annular member has cam pins projecting outwardly therefrom, said slide collar has cam surfaces operatively engaging said cam pins, and said slide collar has a handle for turning it about the hollow annular member to inwardly advance and retract to the hollow annular member along said camming surfaces and with respect to the housing member.

18. A coupling as defined in claim 15 wherein, a pipe portion is connected to an outer end portion of the hollow annular member to extend transversely thereof and supply fluid under pressure thereto, said slide collar has cam surfaces operatively engaging said pipe portion, and said slide collar has means for turning it about said pipe portion to move said cam surfaces on said pipe portion and advance and retract the hollow annular member with respect to the housing member.

19. A coupling as defined in claim 15 wherein, said nose part has a valve seating portion and an adjustable valve mounting, a valve is adjustably positioned on said valve mounting for movement into and out of closing-off engagement with said seating portion to control and shut off fluid flow through the hollow annular member into the housing member.

20. A coupling as defined in claim 19 wherein an operating valve part is carried by the housing member and has a partible socket to operatively engage said valve for adjusting it in the defined manner.

References Cited in the file of this patent

UNITED STATES PATENTS

| | | |
|---|---|---|
| 1,455,406 | Nicolaides | May 15, 1923 |
| 2,259,453 | Beyer et al. | Oct. 21, 1941 |
| 2,479,960 | Osborn | Aug. 23, 1949 |
| 2,587,810 | Beyer | Mar. 4, 1952 |
| 2,589,321 | Anderson | Mar. 18, 1952 |
| 2,635,901 | Osborn | Apr. 21, 1953 |
| 2,709,092 | Wallace | May 24, 1955 |
| 2,768,642 | Sherman | Oct. 30, 1956 |

U. S. DEPARTMENT OF COMMERCE
PATENT OFFICE

CERTIFICATE OF CORRECTION

Patent No. 2,818,082                                           December 31, 1957

Clyde E. Rickard

It is hereby certified that error appears in the printed specification of the above numbered patent requiring correction and that the said Letters Patent should read as corrected below.

Column 10, line 31, for "the off" read -- off the --.

Signed and sealed this 1st day of April 1958.

(SEAL)
Attest:

KARL H. AXLINE                                         ROBERT C. WATSON
Attesting Officer                                     Commissioner of Patents